S. SCHUYLER.
Grain Drier.
No. 31,191.  Patented Jan. 22, 1861.
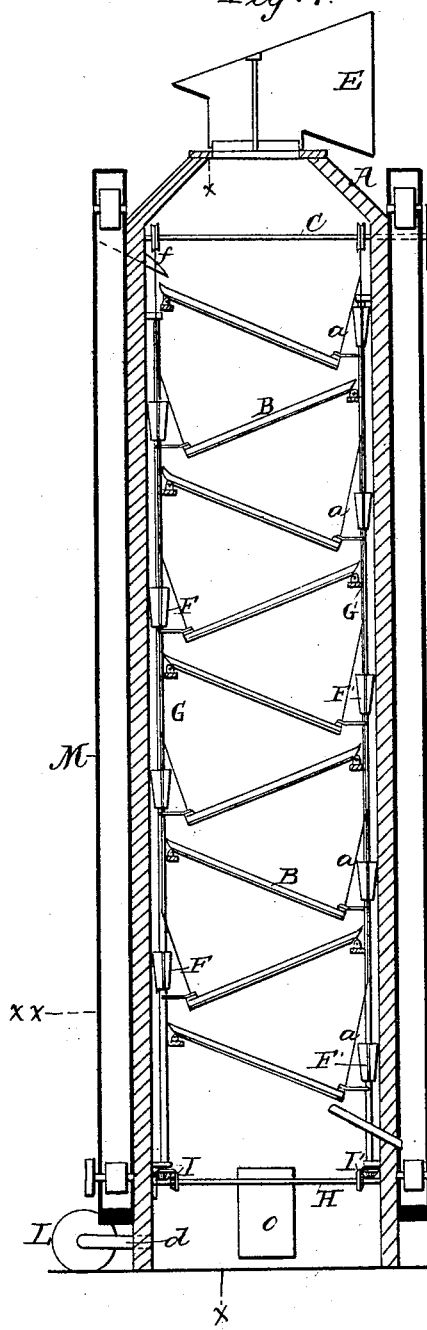
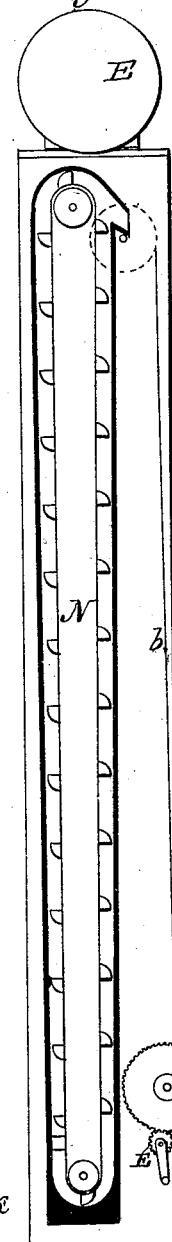
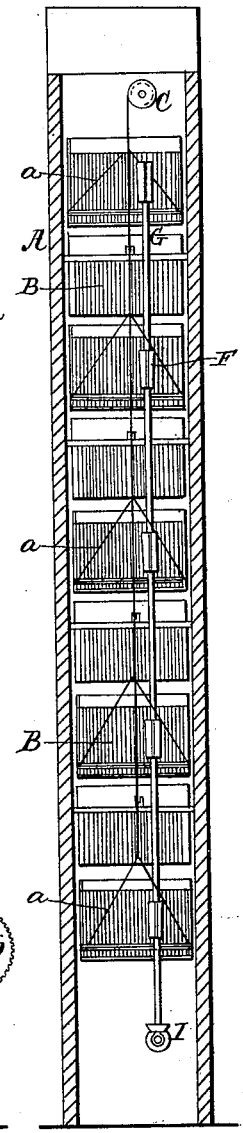
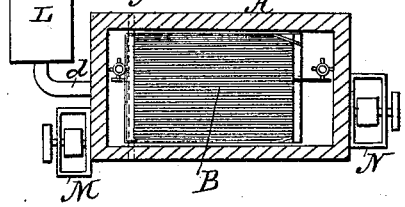
Witnesses.  Inventor
  Per S. Schuyler
  Francis S L

UNITED STATES PATENT OFFICE.

SAMUEL SCHUYLER, OF BROOKLYN, NEW YORK.

GRAIN-DRIER.

Specification forming part of Letters Patent No. 31,191, dated January 22, 1861; Reissued March 17, 1863, No. 1,434.

*To all whom it may concern:*

Be it known that I, SAMUEL SCHUYLER, of Brooklyn, in the county of Kings and State of New York, have invented certain new and useful Improvements in Grain-Driers; and I do hereby declare that the following is a full and exact description of the same, reference being had to the accompanying drawings, and to the letters of reference marked thereon, in which—

Figure 1 is a vertical sectional side view. Fig. 2 is an end elevation. Fig. 3 is a vertical sectional end view, and Fig. 4 a horizontal section taken at the line x x Fig. 1.

A is a stack or tower made of brick or other material of such height as will afford sufficient time for the wet or damp grain in passing from the upper sieve or grated platform successively over the ones below it to become properly dried when it reaches the bottom of the stack—this height being found by practice and experiment to be about fifty feet.

B is a series of sieved or grated platforms, which are hung at one end on a pivot in the center of their width, and at the other end are suspended by chains a, connected to the shaft C, by which they can be changed in their angle of inclination through the gear wheels D, E and the chain or cord b. They are vibrated sidewise, (similar to the "shoe" of a grist-mill) to shake down the grain upon their upper surfaces, by means of the "damsels" F, F', upon the shafts G, G', operated by the shaft H and the gears I, I', at an inclination of about five inches to a foot, the grain deposited upon the platforms will pass off from one platform to the other by its own gravity. This is the inclination adapted to grain that is but slightly dampened, and that requires the minimum amount of time for its passage from the top to the bottom of the stack to be dried; but for grain that is more dampened, or which is wet, the inclination of the platforms is lessened by raising their outer cuts, and the grain is then retained longer upon them, and is shaken down from one platform to the other beneath, by the platforms being shaken or vibrated by the damsels F, F'.

K, is a blower, by which air is blown through the heater L to be heated, and after being heated is passed into the stack A by the pipe d for the purpose of passing upward through the platforms B to dry the grain contained upon them, and is carried off from the top of the stack by and through the ventilator or hood e, which turns upon a pivot to keep its mouth turned away from the course of the wind.

M, is an elevator for raising the grain to be dried to the top of the stack to be deposited (through the spout f) upon the upper one of the series of platforms B, and N is a similar elevator to elevate the dried grain, that has passed down through the stack, and off from the lower platform, up to the top of the stack to be deposited in bins for shipment or storage.

O, is a door in the side of the stack to admit a person to enter to examine, and, if necessary, to adjust or repair its internal arrangements.

If required, the arrangement of platforms shown in the drawings may be made to operate as a kiln for kiln-drying grain, for the purpose of being used for making malt liquors, by elevating the platforms to (or nearly to) a level, and throwing into the bottom of the stack a highly heated current of air, and then depressing the outer ends of the platforms to empty the last platform (after its contents shall have been properly heated) and to pass the contents of each successive upper platform on to the one beneath it.

In case the grain to be dried is very wet, a pipe from the heater L may be carried up on the outside of the stack to throw under the upper platforms a current of heated air to act upon the grain on those platforms with greater effect for drying purposes.

The advantages of my improvements are that a given quantity of damp or wet grain may be dried by their use in less time and at less expense than by any arrangement at present used for the purpose; and that the apparatus can be constructed at less expense and to occupy less room than any other now used or known.

What I claim as my invention and desire to secure by Letters Patent is—

The combination of the series of platforms B, with the elevators M and N, as set forth and for the purpose described.

SAMUEL SCHUYLER.

Witnesses:
WILLIAM F. MILLS,
FRANCIS S. LOVE.